United States Patent
Fauvel et al.

(10) Patent No.: US 10,704,735 B2
(45) Date of Patent: Jul. 7, 2020

(54) METHOD AND DEVICE FOR REPLENISHING A SUPPLY OF CRYOGENIC LIQUID, NOTABLY OF LIQUEFIED NATURAL GAS

(71) Applicant: CRYOSTAR SAS, Hesingue (FR)

(72) Inventors: Philippe Fauvel, Capdenac (FR); Philippe Heisch, Belfort (FR)

(73) Assignee: Cryostar SAS, Hesingue (FR)

( * ) Notice: Subject to any disclaimer, the term of this patent is extended or adjusted under 35 U.S.C. 154(b) by 685 days.

(21) Appl. No.: 14/787,913

(22) PCT Filed: Apr. 25, 2014

(86) PCT No.: PCT/FR2014/051010
§ 371 (c)(1),
(2) Date: Oct. 29, 2015

(87) PCT Pub. No.: WO2014/177796
PCT Pub. Date: Nov. 6, 2014

(65) Prior Publication Data
US 2016/0084441 A1    Mar. 24, 2016

(30) Foreign Application Priority Data

Apr. 30, 2013    (FR) ...................................... 13 53952

(51) Int. Cl.
*F17C 5/00*    (2006.01)
*F17C 7/00*    (2006.01)
(Continued)

(52) U.S. Cl.
CPC ................. *F17C 5/02* (2013.01); *F17C 7/04* (2013.01); *F17C 9/00* (2013.01); *F17C 9/02* (2013.01);
(Continued)

(58) Field of Classification Search
CPC .. F17C 13/002; F17C 13/025; F17C 2223/03; F17C 2223/033; F17C 2227/0309;
(Continued)

(56) References Cited

U.S. PATENT DOCUMENTS 5,571,231 A * 11/1996 Lee ........................... F17C 9/02
62/48.2
5,771,946 A *  6/1998 Kooy ........................ F17C 6/00
141/11

(Continued)

FOREIGN PATENT DOCUMENTS

GB        2333149 A    7/1999

OTHER PUBLICATIONS

Inernational Search Report for PCT/FR2014/051010, dated Feb. 2, 2015, Authorized Officer: Nicol Boris, 4 pages.

*Primary Examiner* — Frantz F Jules
*Assistant Examiner* — Erik Mendoza-Wilkenfel
(74) *Attorney, Agent, or Firm* — Millen White Zelano & Branigan, PC; Brion P. Heaney

(57) ABSTRACT

A method for replenishing the supply of cryogenic liquid from a storage tank (2) includes: pressurizing a container (14) with cryogenic gas at a first pressure, said container having passing through it a first cryogenic fluid flow line referred to as the cold line and a second cryogenic fluid flow line referred to as the hot line, passing cryogenic liquid at a second pressure through the cold line (12), and supplying the container (14) with cryogenic gas at least partially from cryogenic liquid pumped from the storage tank (2) and vaporized. A device is also provided for the method hereinabove.

18 Claims, 1 Drawing Sheet

(51) Int. Cl.
F17C 7/04 (2006.01)
F17C 9/02 (2006.01)
F25D 3/10 (2006.01)
F17C 5/02 (2006.01)
F17C 13/02 (2006.01)
F17C 9/00 (2006.01)

(52) U.S. Cl.
CPC .... *F17C 13/025* (2013.01); *F17C 2205/0326* (2013.01); *F17C 2205/0338* (2013.01); *F17C 2221/01* (2013.01); *F17C 2221/011* (2013.01); *F17C 2221/012* (2013.01); *F17C 2221/014* (2013.01); *F17C 2221/016* (2013.01); *F17C 2221/03* (2013.01); *F17C 2221/031* (2013.01); *F17C 2221/033* (2013.01); *F17C 2223/0161* (2013.01); *F17C 2223/033* (2013.01); *F17C 2223/046* (2013.01); *F17C 2225/0161* (2013.01); *F17C 2225/0169* (2013.01); *F17C 2225/033* (2013.01); *F17C 2225/035* (2013.01); *F17C 2227/0135* (2013.01); *F17C 2227/0311* (2013.01); *F17C 2227/0393* (2013.01); *F17C 2227/04* (2013.01); *F17C 2250/01* (2013.01); *F17C 2250/043* (2013.01); *F17C 2250/0626* (2013.01); *F17C 2250/0631* (2013.01); *F17C 2250/0636* (2013.01); *F17C 2260/025* (2013.01); *F17C 2265/022* (2013.01); *F17C 2265/065* (2013.01); *F17C 2270/0105* (2013.01); *F17C 2270/0139* (2013.01); *F17C 2270/0168* (2013.01); *F17C 2270/0171* (2013.01); *Y02E 60/321* (2013.01)

(58) Field of Classification Search
CPC ...... F17C 2227/0311; F17C 2227/0313; F17C 2227/0316; F17C 2227/0318; F17C 2227/032; F17C 2227/0325; F17C 2227/0339; F17C 2227/0388; F17C 2227/039; F17C 2227/0393; F17C 2227/043; F17C 2227/048; F17C 2250/043; F17C 2250/0434; F17C 2227/0192; F17C 2227/0107; F17C 2225/042; F17C 2225/044; F17C 2225/046; F17C 2225/047; F17C 2250/0439; F17C 2250/0631; F17C 5/007; F17C 2265/061; F17C 7/02; F17C 7/04; F17C 9/00; F17C 9/02; F17C 2225/0123; F17C 2227/0302; F25J 2235/02; F25J 2235/04; F25J 2270/12; F25D 3/10
See application file for complete search history.

(56) References Cited

U.S. PATENT DOCUMENTS

| | | | |
|---|---|---|---|
| 2007/0214807 A1* | 9/2007 | Faka | F17C 5/06 62/50.2 |
| 2012/0102978 A1* | 5/2012 | Lee | F17C 7/02 62/50.1 |

* cited by examiner

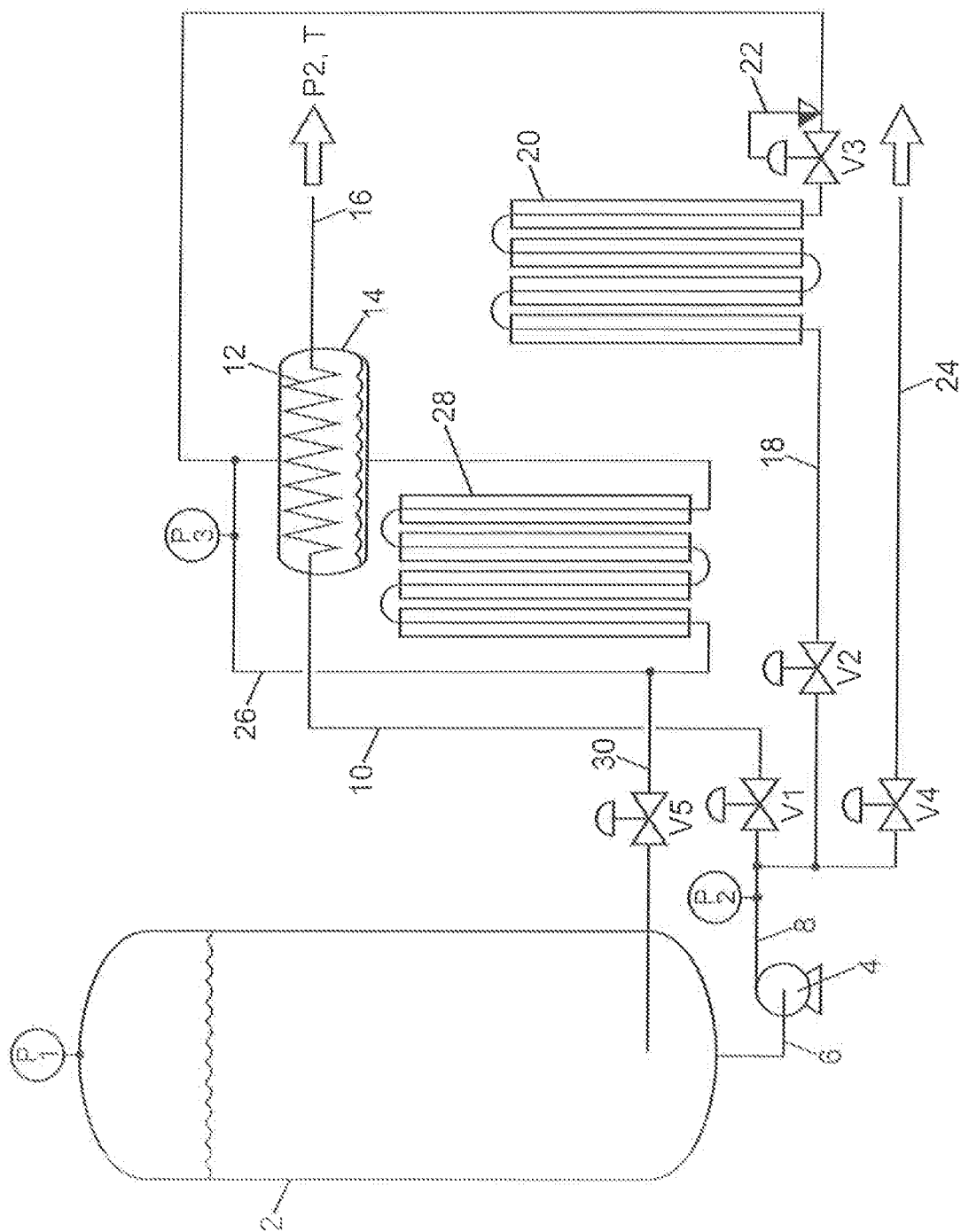

METHOD AND DEVICE FOR REPLENISHING A SUPPLY OF CRYOGENIC LIQUID, NOTABLY OF LIQUEFIED NATURAL GAS

The present invention concerns a method of replenishing cryogenic liquid, notably liquefied natural gas, as well as a device for implementing such a method.

Certain vehicles, most often trucks but also ships, for example, use liquefied natural gas as a fuel. It is necessary to provide replenishing stations for these vehicles in order to "fill up" as is done classically with a vehicle operating on gasoline or diesel.

However, there are several constraints for replenishing a tank with liquefied natural gas (or LNG), which do not exist for gasoline stations. It is required for (all) the vehicles using LNG to have a tank under pressure. Thus, the replenishing cannot be done at ambient pressure. Furthermore, the LNG is not at ambient pressure and needs to be distributed at low temperature.

Reference is made to the preamble of document WO-2011/152965 for a presentation of the prior art regarding LNG replenishing of vehicles (§ [0003] to § [0007]).

This document WO-2011/152965 is considered here as being the closest prior art of the present invention. It presents a method and an apparatus for distribution of LNG making it possible to supply the gas from a storage tank at specified conditions of temperature and pressure. The method described calls for the steps of pressurization of a container (known as packaging vessel in this document) of LNG at a first pressure, then taking the LNG at a second pressure higher than the first pressure to a condenser, which is in a heat transmission relation with the container, and finally extraction of the LNG from the condenser.

The method and the device described in this document make it possible to supply LNG in satisfactory manner at a predetermined pressure and temperature.

The problem which the present invention proposes to solve comes from the fact that all the vehicles do not require the same pressure and the same temperature for replenishing of LNG. With a device as described in document WO-2011/152965 it is possible to vary the pressure (and the temperature) of replenishing but in order to switch from one pressure (and its associated temperature) to another the time needed may be relatively long, on the order of an hour or more. Hence, it is necessary to schedule, for example, the replenishing of vehicles with one replenishing pressure on one day, and those with another pressure the next day.

It will be evident to the person skilled in the art that such replenishing conditions lack flexibility, since it should be possible to replenish a vehicle rapidly, and it is preferably desirable to replenish the vehicles in their order of arrival at the replenishing station.

The present invention thus has the purpose of providing a method (and at least one corresponding device) making it possible to deliver LNG, or more generally cryogenic liquid, at given conditions of temperature and pressure and to quickly change these conditions so as to replenish a vehicle needing to fill up at a second pressure following a replenishing of a vehicle needing to replenish its tank at a different pressure without having to wait a long time.

The method according to the present invention will preferably be economical in terms of energy.

To this end the present invention proposes a method of replenishing cryogenic liquid from a storage tank comprising the following steps:

pressurizing a container with cryogenic gas at a first pressure, said container being traversed by a first cryogenic fluid circulation line, known as the cold line, and a second cryogenic fluid circulation line, known as the hot line, passing a cryogenic liquid through the cold line at a second pressure, and supplying cryogenic liquid downstream from the cold line.

According to the present invention it is arranged in an original manner that the container is supplied with cryogenic gas at least partially from cryogenic liquid pumped into the storage rank and vaporized.

Whereas in the devices known from the prior art the cryogenic gas used to feed the hot line and to pressurize the container came from the portion of the storage tank containing fluid in the gaseous state (upper part of the tank), it is proposed here to withdraw cryogenic liquid from the storage tank, change it to the gaseous state and utilize the cryogenic gas so obtained to pressurize the container. It is thus possible to entirely decouple the pressure inside the storage tank from the temperature at which the cryogenic fluid is delivered at the outlet of the replenishing device. The pressurization of the container is, for example, realized with the aid of a pump and of an evaporator, which elements can be arranged in series between the storage reservoir and the container.

When implementing a method according to the present invention, the cryogenic liquid at desired pressure and at desired temperature is delivered to the outlet of the cold line traversing the container. The present invention makes it possible to have more elevated pressures in the container than in the methods of the prior art. Therefore, a larger range of pressures can be used and the range of temperatures for delivery of cryogenic liquid is also larger.

To achieve control of the outlet temperature of the cryogenic liquid, the method of replenishing according to the invention advantageously includes a stage of pressure regulation after vaporization of the cryogenic liquid and before its introduction into the container.

In order for a single pump to be enough to implement the method, it is advantageously provided that cryogenic liquid is pumped outside of the storage tank, and the liquid so pumped is used on the one hand to feed the cold line and on the other hand to be vaporized before being taken to the container.

To pressurize the container, it is advantageously provided that in addition cryogenic liquid condensed within the container is revaporized prior to being introduced into said container. There are then two sources of feeding cryogenic gas for the pressurized container and this makes it possible to limit the withdrawal of cryogenic liquid for the pressurization. The condensed cryogenic liquid inside the enclosure can be, for example, revaporized in a loop comprising an evaporator before being reintroduced into this container.

The present invention is particularly well adapted in the case in which the cryogenic liquid is liquefied natural gas and or the cryogenic gas is natural gas in the gaseous state. However, other cryogenic liquids (nitrogen, air, argon, hydrogen, etc.) are perfectly compatible with the present invention.

The present invention also concerns a device for the replenishing of cryogenic liquid comprising a storage tank, a pressurized container traversed by a first line known as the cold line with an inlet fed by cryogenic liquid coming from the storage tank and a cryogenic liquid outlet to a tank to be filled, which container is furthermore supplied by means for feeding cryogenic gas under pressure for the pressurization of the container and comprising an evacuation for condensed liquid.

According to the present invention, in such a replenishing device the means of feeding the container with cryogenic gas under pressure comprises a feeding of cryogenic liquid coming from the storage tank as well as means of vaporization.

In such a replenishing device a pump and an evaporator can be arranged in series, for example, between the storage reservoir and the container in order to pressurize the latter.

To achieve a regulation of the output temperature, it is proposed to have means of pressure regulation between the means of vaporization and the pressurized container.

In order to economize on cryogenic fluid, the device advantageously comprises a loop with a heat exchanger, said loop comprising a feed line for the heat exchanger from the pressurized container making it possible to withdraw, preferably by gravity, condensed cryogenic gas in liquid form from within the pressurized container and a return line connecting the outlet of the heat exchanger to the pressurized container making it possible to reintroduce cryogenic gas to the pressurized container. The loop so created enables a "recycling" of the cryogenic gas condensed into liquid form in the pressurized container and thus allows an economizing of the cryogenic liquid coming from the tank. It is also possible to achieve a pressure regulation in the area of the pressurized container by connecting the loop to the storage tank by a line having a valve. This line can be connected to the loop upstream or downstream from the heat exchanger.

One preferred embodiment of the replenishing device according to the invention calls for this device to have a pump designed to withdraw cryogenic liquid from the storage tank and bring the cryogenic liquid so withdrawn up to a pressure greater than the pressure of the liquid in the storage tank. In order to have only a single pump, downstream from the pump a third line feeds the cold line and a fourth line branching off from the third one feeds the means of vaporization situated upstream from the container.

Advantageously, the replenishing device according to the invention furthermore comprises a delivery line of cryogenic liquid able to deliver the cryogenic liquid directly from the storage tank.

BRIEF DESCRIPTION OF THE DRAWING

Details and advantages of the present invention will appear more clearly from the following description, making reference to the enclosed FIGURE of a schematic diagram, in which:

The single FIGURE is a schematic view illustrating a preferred embodiment of a replenishing device according to the present invention.

This FIGURE illustrates a replenishing station for liquefied natural gas, or LNG. Of course, the same or a slightly adapted station could also be used for the distribution of other cryogenic fluids, such as nitrogen, oxygen, air, argon, ethylene, hydrogen, or a mixture of certain of these fluids.

The replenishing station shown is intended more particularly to replenish the tanks of vehicles of every type, both land vehicles (notably trucks) and also ships or perhaps airplanes. The purpose of such a replenishing station is to provide liquefied natural gas to vehicles under conditions of pressure and temperature that are specific to each vehicle from a single storage tank 2.

The storage tank 2 contains liquefied natural gas as well as natural gas in the gaseous state on top of the natural gas in the liquid state. The pressure prevailing in the storage tank 2 is known hereinafter as P1. The means of controlling and maintaining the pressure inside the storage tank 2 are familiar to the skilled person and no described here. Pressure variations in the storage tank 2 are permitted within the range regulated by the aforementioned means of control and maintenance. Typically, the pressure P1 is between 2 and 10 bars (or between $2.10^5$ Pa and $10^6$ Pa), for example, around 6 bars ($6.10^5$ Pa).

A cryogenic pump 4 is provided to withdraw LNG from the storage tank by a line 6. The pump 4 makes it possible to bring the liquid of the tank up to a pressure P2 greater than the pressure P1. The pump 4 is such that the pressure P2 is adjustable as a function of the requirements explained further below.

The LNG pumped by the pump 4 is sent to a line 8 which then subdivides into three branches, described below.

A first branch 10 takes the LNG from the outlet of the pump 4 to a first line, known as the cold line 12, which then traverses a pressurized container 14. This container 14 is furthermore traversed by a second line, known as the hot line. In the FIGURE, the cold line 12 extends horizontally, while the hot line extends vertically. This hot line in fact provides for the feeding of gas under pressure from the pressurized container 14 serving as an envelope or "skin" for the cold line 12. Downstream, it enables the evacuation of condensed liquid from said container. In one preferred embodiment, the cold line 12 and the container 14 both form one and the same component. This unit forms a heat exchanger between the fluid (liquid) designed to circulate in the cold line and the fluid (gaseous upstream) designed to circulate in the hot line. This unit, in the present application, makes it possible to regulate the temperature of the liquid circulating in the cold line and forms a condenser in which a portion of the gas fed by the hot line condenses. A valve V1 makes it possible to regulate the flow rate of LNG in the first branch 10. At the outlet of the cold line 12, the liquefied natural gas is taken by a line, known as the main line 16, to feed a vehicle with fuel (LNG) under the conditions of temperature and pressure required by this vehicle (not shown).

A second branch 18, inside which the flow rate is regulated by a valve V2 placed upstream from that branch, takes the liquefied natural gas pumped by the pump 4 to a first evaporator 20. A regulator 22 associated with a valve V3 makes it possible to regulate the pressure of the natural gas in the gaseous state at the outlet of the first evaporator 20 to feed the container 14. It is assumed that the regulating pressure in the areas of the regulator 22 is essentially the pressure prevailing in the container 14. This pressure is termed hereafter P3. The pump 4, the second branch or liquid line 18, the valve V2. the valve V3 and the regulator or valve regulator 22 are included in means for feeding of cryogenic gas under pressure.

A third branch 24 is provided to directly deliver liquefied natural gas under the conditions in which it is found in the storage tank 2. This branch comprises only one valve V4 allowing a regulation of its flow rate. The liquid delivered by the third branch 24 can also be brought up to a pressure P2 (greater than the pressure P1 of the LNG in the storage tank 2) by the pump 4. In this latter case, the LNG is delivered supercooled at a pressure P2 at a temperature T2 lower than the saturation temperature of the natural gas at pressure P2.

One will also note in the FIGURE the presence of a loop 26 containing a second evaporator 28. This loop 26 has the purpose of withdrawing natural gas which has condensed in the container 14 and taking it to the second evaporator 28, where it returns to the gaseous state to again feed the container 14. The second evaporator 28, like the first evaporator 20, can be an evaporator in heat exchange with the surrounding air, or an electrical or steam evaporator (or any other device able to produce a vaporization of the liquid).

A regulation circuit comprising a line 30 connecting the loop 26 downstream from the second evaporator 28 to the storage tank 2 as well as a regulating valve V5 is advantageously provided. Its functioning shall be explained further below. In particular, it makes possible a rapid adapting, under certain conditions, of the pressure in the container 14 and in the corresponding circuit.

Other control and management elements are provided for the above-described station but are not described or illustrated in the FIGURE. These elements are known to the person skilled in the art and do not contribute directly to the present invention.

The functioning of the replenishing station described above is as follows for the replenishing of a vehicle with liquefied natural gas.

It is assumed that one wishes to refuel the vehicle at a given pressure P2 and at a given temperature T. This temperature T corresponds to the saturation temperature of the natural gas at a pressure P3.

The cryogenic pump 4 is used to bring the LNG present in the storage tank 2 from a pressure P1 to the required pressure P2 (except for charging losses).

The majority of the liquid pumped and brought up to the pressure P2 is sent by the first branch 10 through the cold line 12. This liquid then traverses the container 14 in which its pressure remains essentially unchanged, but where its temperature varies and emerges at the pressure P2 and at temperature T and feeds the main line 16 to the vehicle being refueled.

A portion of the liquid so pumped is withdrawn to feed the first evaporator 20. This evaporation of LNG is used to pressurize the container 14. The regulator 22 is used to obtain a pressure P3 in the hot line of the circuit, in the container 14 and in the loop 26.

The unit formed by the cold line and the container 14 is present, for example, in the form of a plate type heat exchanger, making possible a heat exchange between the natural gas in the liquid state in the cold line 12 and the natural gas in the gaseous state at pressure P3 and at the corresponding saturation temperature. Thus, the LNG in the liquid state emerging from the cold line 12 is essentially at the temperature of the natural gas in the gaseous state, that is, the saturation temperature of the natural gas at the pressure P3, which corresponds to the desired delivery temperature at the outlet from the main line 16.

During the heat exchange between the LNG in the liquid state entering the cold line 12 and the natural gas in the gaseous state in the container, gas is made to change to the liquid state. This liquid is then withdrawn, preferably by gravity, to be vaporized in the second evaporator 28 and returns to the gaseous state in order to be introduced into the container 14 once more in this gaseous state. The pressure in the loop 26 is regulated (with the help of the regulator 22) so that the gas is essentially at pressure P3. This regulation makes it possible to control the input of gas coming from the first evaporator 20 as a function of the quantity of liquid formed by condensation in the container 14 in order to achieve an equilibrium in the circuit and guarantee the output temperature of the liquefied natural gas in the main line 16.

When the pressure in the loop 26 is too high, or when it is necessary to lower the pressure P3 to change the LNG delivery temperature in the main line 16, the pressure drop can be regulated with the help of the valve V5. The line 30, containing the valve V5, preferably empties into the portion of the storage tank 2 containing natural gas in the liquid state. Thus, the gas leaving the loop 26 condenses in the liquid of the tank and limits the rise in pressure in the tank. The pressure regulation here is accomplished downstream from the second evaporator 28, but one could also contemplate, in the configuration shown, a pressure regulation upstream from this evaporator.

After the replenishing of one or more vehicles under the same conditions of pressure and temperature, when a vehicle arrives at the replenishing station and requires filling up with different conditions of temperature and pressure, on the one hand the LNG delivery pressure should be adapted and on the other hand the delivery temperature.

To vary the temperature, as follows from the preceding description, one should vary the pressure, and thus also the temperature of condensation, in the container 14. One should thus act at the level of the regulator 22 and possibly of the valve V5.

It will be noted in the preceding description that the pressure (and the temperature) in the main line 16, that is for the LNG delivery, is independent of the pressure in the storage tank 2. Thus, the LNG can be maintained as cold as possible in the storage tank 2.

The method (and the corresponding device) makes it possible to limit the input of heat in the storage tank 2. Therefore, one also limits the vaporization of the LNG present in the tank and thus the purging of gas in the gaseous state by a corresponding valve, making it possible to avoid excess pressure in the tank (but also causing a loss of natural gas).

Thus, the method and device for replenishing make it possible to rapidly change the conditions of delivery of the LNG. It is not necessary to act on the pressure of the gaseous phase present in the storage tank to modify the conditions of delivery at the outlet of the main line.

The method of replenishing has been described above for the replenishing of vehicles which can be vehicles of every kind. It can also be implemented to feed another storage tank from a large-size tank.

The method according to the invention makes it possible to maintain a certain pressure in the tank in which cryogenic liquid is withdrawn or in the tank receiving the cryogenic liquid when a pressurization of the gas is necessary.

Of course, the present invention is not limited to the method of replenishing and the corresponding device described above as a merely illustrative and nonlimiting example. It also pertains to all variant embodiments mentioned and other variants within the reach of a person skilled in the art in the framework of the following claims.

What is claimed is:

1. A method of replenishing cryogenic liquid from a storage tank (2) comprising:
   pressurizing a container (14) with cryogenic gas at a first pressure, said container being traversed by a first cryogenic fluid circulation line, the first cryogenic fluid circulation line being a cold line (12) coming from the storage tank, wherein said storage tank contains cryogenic liquid;
   passing a first portion of cryogenic liquid from said storage tank through the cold line at a second pressure; and supplying the first portion of cryogenic liquid downstream from the cold line for replenishing a tank;

wherein pressurizing of the container is performed by supplying the container with a vaporized cryogenic liquid, wherein the vaporized cryogenic liquid is at least partially obtained from a second portion of cryogenic liquid, pumped from the storage tank, which is vaporized to form said vaporized cryogenic liquid before being supplied to the container.

2. The method of claim 1, wherein the second portion of cryogenic liquid, pumped from the storage tank, is vaporized in an evaporator (20).

3. The method of claim 1, further comprising, after vaporizing of the cryogenic liquid and before introducing the vaporized cryogenic liquid into the container, the pressure of the vaporized cryogenic liquid is regulated.

4. The method of claim 1, further comprising pumping the second portion of cryogenic liquid from the storage tank to supply the second portion of cryogenic liquid to the cold line.

5. The method of claim 1, further comprising removing condensed liquid from the container, revaporizing the condensed liquid removed from the container, and introducing revaporized condensed liquid into the container.

6. The method of claim 5, wherein a loop (26) comprising an evaporator (28) is employed for revaporizing the condensed liquid before introducing said revaporized condensed liquid into the container.

7. The method of claim 1, wherein the cryogenic liquid comprises liquefied natural gas, and the cryogenic gas comprises natural gas in a gaseous phase.

8. A device for replenishing of cryogenic liquid, comprising:
   a storage tank (2) for cryogenic liquid;
   a first line (6) for withdrawing a first portion of cryogenic liquid from the storage tank;
   a pump (4) for pressurizing the first portion of cryogenic liquid removed from the storage tank to form pressurized cryogenic liquid;
   a cold line (12), in fluid communication with said storage tank (2) via said pump (4) and said first line (6), wherein said cold line (12) traverses a pressurized container (14) whereby a first portion of the pressurized cryogenic liquid flows through said cold line (12), and said cold line (12) having a cryogenic liquid outlet in fluid communication with another tank which is to be filled;
   an evaporator (20) also in fluid communication with said storage tank (2) via said pump (4) and said first line (6) for vaporizing a second portion of the pressurized cryogenic liquid to form pressurized cryogenic gas; and
   a second line for feeding the pressurized cryogenic gas from the evaporator (20) to the pressurized container (14).

9. The device of claim 8, further comprising a pressure regulator (22, V3) disposed between the evaporator and the pressurized container.

10. The device of claim 8, further comprising:
    a loop (26) comprising:
    a feed line for withdrawing by gravity condensed cryogenic liquid from within the pressurized container (14) and feeding the condensed cryogenic liquid to a heat exchanger (28) wherein the condensed cryogenic liquid is vaporized to form vaporized condensed cryogenic liquid; and a return line connecting the heat exchanger (28) to the pressurized container for reintroducing the vaporized condensed cryogenic liquid from the heat exchanger to the pressurized container.

11. The device of claim 10, further comprising a line having a valve (V5) connecting the loop to the storage tank.

12. The device of claim 8, wherein said pump (4) withdraws cryogenic liquid from the storage tank and increases the pressure of the withdrawn cryogenic liquid to a pressure which is greater than the pressure of the cryogenic liquid in the storage tank.

13. The method according to claim 1, wherein
    a pump is provided for pumping cryogenic liquid, pumped from the storage tank,
    a further line (10) is provided positioned downstream from the pump for feeding cryogenic liquid to the first cryogenic circulation line (12), and
    and an additional line (18) branching off from the further line is provided for feeding an evaporator (20) positioned upstream from the container.

14. The method according to claim 1, further comprising removing condensed cryogenic liquid from the container,
    evaporating the condensed cryogenic liquid in an evaporator (28) to form vaporized condensed cryogenic liquid, and
    introducing the vaporized condensed cryogenic liquid into the container.

15. A method of replenishing a tank with cryogenic liquid from a storage tank comprising:
    withdrawing a stream of cryogenic liquid from said storage tank and increasing the pressure of the stream of cryogenic liquid withdrawn from said storage tank using a pump to form a stream of pressurized cryogenic liquid,
    introducing a first substream of said stream of pressurized cryogenic liquid into a cryogenic fluid circulation line, wherein said cryogenic fluid circulation line traverses a container pressurized with vaporized cryogenic gas,
    introducing a second substream of said stream of pressurized cryogenic liquid into an evaporator wherein said second substream is vaporized to form the vaporized cryogenic gas,
    introducing the vaporized cryogenic gas into said container to thereby pressurize said container with the vaporized cryogenic gas,
    introducing the first substream of said stream of pressurized cryogenic liquid from said cryogenic fluid circulation line into a tank needing is to be replenished.

16. The method according to claim 15, further comprising removing condensed cryogenic liquid from the pressurized container,
    evaporating the condensed cryogenic liquid in a further evaporator to form vaporized condensed cryogenic liquid, and
    introducing the vaporized condensed cryogenic liquid into the container.

17. A device for replenishing a tank with cryogenic liquid from a storage tank, said device comprising:
    a storage tank for cryogenic liquid;
    a pressurized container traversed by a first line, said first line being in fluid communication with the storage tank and in fluid communication with said tank which is to be replenished;
    a line for withdrawing a stream of cryogenic liquid from said storage tank and a pump for increasing the pressure of the withdrawn stream of cryogenic liquid using to form a stream of pressurized cryogenic liquid, a line for introducing a first substream of the stream of pressurized cryogenic liquid into the first line, a line for introducing a second substream of said stream of pressurized cryogenic liquid into an evaporator wherein said second substream is vaporized to form vaporized cryogenic gas, a line for introducing the vaporized cryogenic gas into said container to thereby pressurize said pressurized container with vaporized cryogenic gas, and a line for introducing the first substream of said stream of pressurized cryogenic liquid from said first line into a tank needing to be replenished.

18. The device of claim 17, further comprising:

a feed line for withdrawing condensed cryogenic liquid from the pressurized container and for feeding the condensed cryogenic liquid to a further evaporator where the condensed cryogenic liquid is vaporized to form vaporized condensed cryogenic liquid; and a return line connecting the further evaporator to the pressurized container for reintroducing vaporized condensed cryogenic liquid from the further evaporator into the pressurized container.

* * * * *